(12) United States Patent
DeMatteis

(10) Patent No.: US 6,186,933 B1
(45) Date of Patent: Feb. 13, 2001

(54) PLASTIC BAG MANUFACTURING PROCESS

(75) Inventor: Robert B. DeMatteis, Grass Valley, CA (US)

(73) Assignee: Bob DeMatteis Co., Grass Valley, CA (US)

( * ) Notice: Under 35 U.S.C. 154(b), the term of this patent shall be extended for 0 days.

(21) Appl. No.: 09/257,843

(22) Filed: Feb. 25, 1999

Related U.S. Application Data

(60) Provisional application No. 60/092,232, filed on Jul. 9, 1998, provisional application No. 60/088,613, filed on Jun. 9, 1998, provisional application No. 60/088,612, filed on Jun. 9, 1998, provisional application No. 60/089,582, filed on Jun. 17, 1998, provisional application No. 60/089,583, filed on Jun. 17, 1998, and provisional application No. 60/092,233, filed on Jul. 9, 1998.

(51) Int. Cl.$^7$ .............................. B31B 1/64; B31B 49/04
(52) U.S. Cl. ......................... 493/193; 493/204; 493/227; 493/288
(58) Field of Search .................................. 493/204, 193, 493/194, 195, 196, 203, 227, 288

(56) References Cited

U.S. PATENT DOCUMENTS

| | | |
|---|---|---|
| Re. 33,264 | 7/1990 | Baxley . |
| Re. 34,324 | 7/1993 | Haenni . |
| D. 287,572 | 1/1987 | Dancy . |
| D. 288,779 | 3/1987 | Pilon . |
| D. 307,555 | 5/1990 | Haenni . |
| D. 308,170 | 5/1990 | Wilfong . |
| D. 323,619 | 2/1992 | Wilfong . |
| D. 325,311 | 4/1992 | Mygind . |
| D. 396,636 | 8/1998 | Wilfong . |
| 4,480,750 | 11/1984 | Dancy . |
| 4,529,090 | 7/1985 | Pilon . |
| 4,676,378 | 6/1987 | Baxley . |
| 4,696,403 | 9/1987 | Hoover . |
| 4,786,275 | 11/1988 | Hoover . |

(List continued on next page.)

*Primary Examiner*—Peter Vo
*Assistant Examiner*—Hemant M. Desai
(74) *Attorney, Agent, or Firm*—Townsend and Townsend and Crew LLP

(57) ABSTRACT

A process for bag manufacture of a bag having a first dimension from a sealed bottom of the bag to an open top of the bag, the bag being fabricated from a continuous tube of plastic film bag material. The process includes the steps of providing a continuous tube of plastic film bag material. The side edges of the bat material are folded between a front bag panel and a rear bag panel to form gussets. A sealing station having apparatus for placing two parallel and spaced apart seals and a knife for cutting the continuous tube of the plastic film bag material between the two parallel and spaced apart seals; First adjacent double seals are formed across the front bag panel and the rear bag panel, the double seals in parallel side-by-side relation with one another with the plastic film bag material there between. The continuous tube of plastic film bag material is at least twice the first dimension from the sealed bottom of the bag to the open top of the bag. This forms second adjacent double seals across the front bag panel and the rear bag panel, the second adjacent double seals in parallel side-by-side relation with one another. By cutting the continuous tube of plastic film bag material between the second adjacent double seals, a double bag unit is formed and severed having single seals at opposite ends of the double bags.

4 Claims, 7 Drawing Sheets

U.S. PATENT DOCUMENTS

| | | |
|---|---|---|
| 4,793,539 | 12/1988 | Haenni . |
| 4,807,754 | 2/1989 | Rowe . |
| 4,819,899 | 4/1989 | Weil . |
| 4,849,090 | 7/1989 | Case . |
| 4,872,766 | 10/1989 | Dancy . |
| 4,911,560 | 3/1990 | Hoover . |
| 4,923,436 | 5/1990 | Gelbard . |
| 4,925,512 | 5/1990 | Briand . |
| 4,930,385 | 6/1990 | Wilfong . |
| 4,953,664 | 9/1990 | Vrooman . |
| 4,981,216 | 1/1991 | Wilfong . |
| 4,995,860 | 2/1991 | Wilfong . |
| 5,020,750 | 6/1991 | Vrooman . |
| 5,125,604 | 6/1992 | Vrooman . |
| 5,207,367 | 5/1993 | Dunn . |
| 5,207,368 | 5/1993 | Wilfong . |
| 5,226,858 * | 7/1993 | Snowdon ............... 493/195 |
| 5,244,450 * | 9/1993 | Koehn ................ 493/195 |
| 5,335,788 | 8/1994 | Beasley . |
| 5,362,152 | 11/1994 | Fletcher . |
| 5,562,580 | 10/1996 | Beasley . |
| 5,667,173 | 9/1997 | Wilfong . |
| 5,845,779 | 12/1998 | Wilfong . |
| 5,881,882 | 3/1999 | Fletcher . |

* cited by examiner

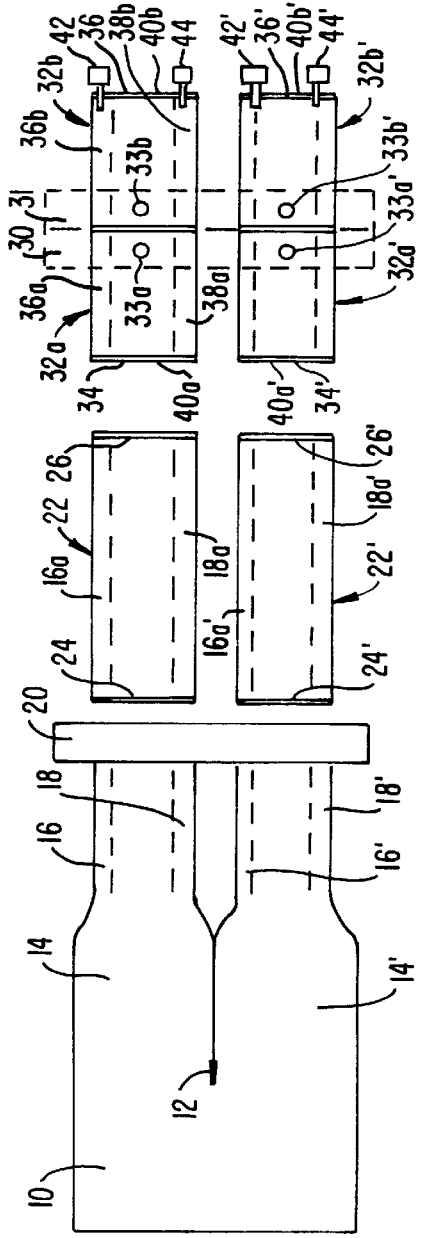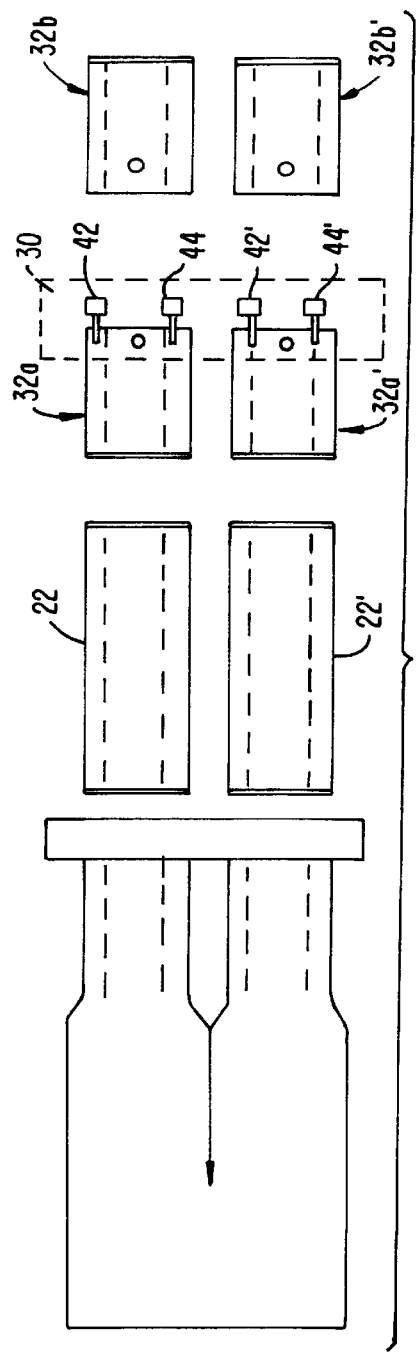

PLASTIC BAG MANUFACTURING PROCESS

CROSS-REFERENCES TO RELATED APPLICATIONS

This application claims priority from Provisional Patent Application Ser. No. 60/092,232 filed Jul. 9, 1998 entitled Plastic Bag Manufacturing Process by the named inventor herein.

Provisional Patent Application Ser. No. 60/088,613 filed Jun. 9, 1998 by the named inventor herein entitled Plastic Film Hinging Patent Application now Ser. No. 09/257,345 filed Feb. 25, 1999 of even date herewith is incorporated by reference as if fully set forth herein.

Provisional Patent Application entitled Cold Sealing of Plastic Film Ser. No. 60/088,612 filed Jun. 9, 1998. by the named inventor herein now patent application Ser. No. 09/257,848 filed Feb. 25, 1999 of even date herewith entitled Apparatus and Process for Cold Seal in Plastic Bags is likewise incorporated by reference as if fully set forth herein.

Provisional Patent Application Ser. No. 60/089,582 filed Jun. 17, 1998 by the named inventor herein entitled Plastic Bag Bundling System now patent application Ser. No. 09/258,010 filed Feb. 25, 1999 of even date herewith entitled Plastic Bag Bundling System is likewise incorporated by reference as if fully set forth herein.

Provisional Patent Application Ser. No. 60/089,583 filed Jun. 17, 1998 by the named inventor herein with Don Pansier of Greenbay Wisconsin entitled Automatic Ventilating System. Patent application Ser. No. 09/258,033 filed Feb. 25, 1999 of even date herewith now U.S. Pat. No. 6,113,269 entitled Automatic Ventilating System is likewise incorporated by reference as if fully set forth herein.

Finally, Provisional Patent Application Ser. No. 60/092,233 filed Jul. 9, 1998 entitled Plastic Film Rigidity Means by the named inventor herein now patent application Ser. No. 09/258,015 filed Feb. 25, 1999 of even date herewith entitled Plastic Film Rigidity Means is likewise incorporated by reference as if fully set forth herein.

The above Provisional Applications and all following Regular Patent Applications filed of even date herewith— and all of them—are herein incorporated by reference as if fully set forth herein.

BACKGROUND OF THE INVENTION

Field of the Invention

This invention relates to a process of manufacturing plastic bag and film products that may be used for a multitude of purposes such as, but not limited to, fast foods, supermarkets, retail merchandise and point-of-purchase bags.

More specifically, this invention relates to a process that produces a high volume output while having the flexibility to form plastic bags and film products of an ordinary variety or of a unique, highly specific shape.

Common plastic bag styles used by retailers in fast food chains, supermarkets and general merchandise, as well as in point-of-purchase applications, are typically of the bottom seal or sideweld variety. These bags are usually gusseted along their sides or along the bottom with the open bag mouth at the top. Many of these common bags have carrying handles, usually of the strap variety or die-cut holes, and any take on unique shapes, such as the bags of U.S. Pat. No. 4,717,262 Roen, et al, U.S. Pat. No. 4,676,378 Baxley, et al., and my U.S. Pat. No. 4,759,639. Plastic bags of these varieties are typically made on bag machines, which run from 2 to 5 lanes across in order to maximize production efficiencies. Upon the final cutting and sealing operation, they are stacked up and usually die cut to create handles holes, strap handles, tabs, or unique bag shapes.

We have learned from U.S. Pat. No. 5,226,858 Snowden a method of improving the output of certain types of detachable bags by making a single intermediate die cut that leaves them interconnected at their open ends. The die cut leaves a traverse, weakened tear line that extends across the bag width, which keeps the interconnected bags together after the die cutting process. The bags are then cut and separated at the intermediate tear line, or are folded over into packs, either of which would then be packed in a shipping carton. Folding the bags over into packs will create an undesirable situation if a detachable bag pack is to be subsequently mounted onto hook type holders. The folding process will cause the bags to shingle, thereby making it very difficult to line up the mounting holes in the detachable tabs. Extra time and labor is also required in order to separate the interconnected bags, regardless of their ultimate use.

Whether a bag pack is bottom sealed or sidewelded, a process that can take a bag stack and sever it into two or more independent stacks—without being S interconnected with traverse tear lines, and incurring extra handling— would be desirable. The handling of the bag packs must be a simple easy-to-use method to ensure a quality output with minimum training. Furthermore, the process should be versatile and capable of making any number of bag styles—not just limited to detachable bags.

SUMMARY OF THE INVENTION

A process for bag manufacture of a bag having a first dimension from a sealed bottom of the bag to an open top of the bag, the bag being fabricated from a continuous tube of plastic film bag material. The process includes the steps of providing a continuous tube of plastic film bag material. The side edges of the bag material are folded between a front bag panel and a rear bag panel to form gussets. Preferably, the front bag panel and the rear bag panel are confronted to and in contact with one another at an inside surface of the front bag panel and the rear bag panel. A sealing station having apparatus for placing two parallel and spaced apart seals and a knife for cutting the continuous tube of the plastic film bag material between the two parallel and spaced apart seals. First adjacent double seals are formed across the front bag panel and the rear bag panel, the double seals in parallel side-by-side relation with one another with the plastic film bag material there between. These seals are cut across the continuous tube of plastic film bag material between the first adjacent double seals. The continuous tube of plastic film bag material is at least twice the first dimension from the sealed bottom of the bag to the open top of the bag. This forms second adjacent double seals across the front bag panel and the rear bag panel, the second adjacent double seals in parallel side-by-side relation with one another. By cutting the continuous tube of plastic film bag material between the second adjacent double seals, a double bag unit is formed and severed having single seals at opposite ends of the double bag unit with a continuous tube of plastic film bag material having two first dimensions between the single seals at opposite ends of the double bag unit.

The present invention refers to a process of manufacturing and die cutting bottom seal or sideweld bags into two or more independent stacks per lane. The versatility of the present invention lends itself to create new bag styles that have never before been cost-effective to manufacture.

The present invention does this by first sealing flattened tube stock at both ends and then die cutting through the entire stack at an intermediate point, thus creating two independent bag stacks. Once the die cutting operation has been completed, the two newly formed, independent bag stacks are then mechanically transferred to a packing station for packing into shipping cartons.

By cutting the bag stacks at this intermediate point, a multitude of bag styles and shapes can be formed that would otherwise not be cost effective to produce. This may include bags with extended tabs and portions above or below the bag mouth, which tabs would be perfectly aligned, bags with sculptured shoulders, T-shirt style grocery bags and so on.

BRIEF DESCRIPTION OF THE DRAWINGS

FIG. 3 is a plan view of the present invention, which shows the process of die cutting preformed plastic tubes that are sealed at both ends, into independent stacks of common bottom sealed plastic bags.

FIG. 4 is a plan view of the present invention of FIG. 3, which shows the process of transferring the die cut stacks to a packing location.

DESCRIPTION OF THE SPECIFIC EMBODIMENTS

Figure 1:
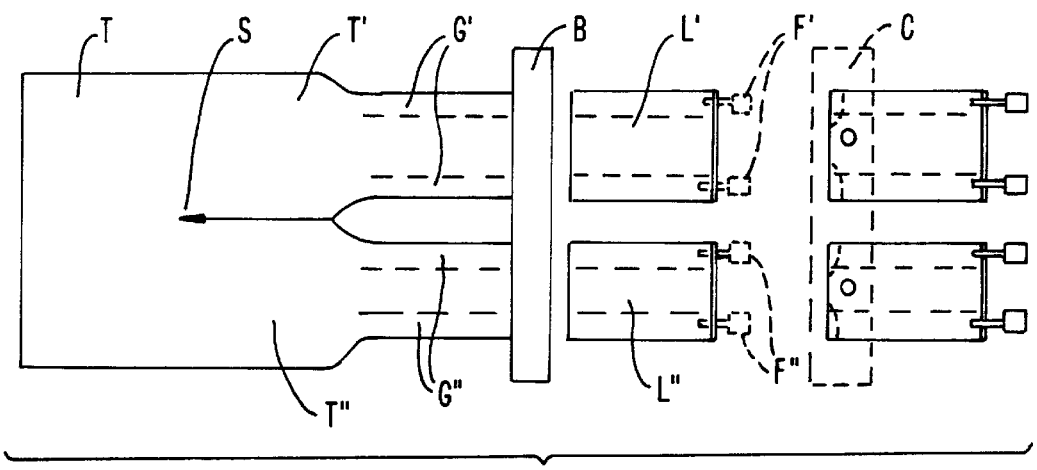
FIG. 1 is a plan view of a prior art process, which illustrates a typical bottom seal bag manufacturing process.

In FIG. 1 the prior art bottom seal process begins with a flattened tube T, which is slit sealed at S into two smaller flattened tubes T' and T", which smaller tubes are side gusseted at locations G' and G". After each individual bag is bottom sealed and severed at bottom seal bar B, the bags are stacked up at location L' and L", which stacks (typically of 50 bags or so) are grasped by fingers sets F' and F" and transported to die-cutting station C. After die cutting, the bag stacks are typically moved to a conveyor belt or packing station, in which the die cut bag stacks are loaded into shipping cartons. In his prior art example the bags being manufactured are die-cut handled Dual-tab bags like hose described in U.S. Pat. No. 4,759,639.

Figure 2:
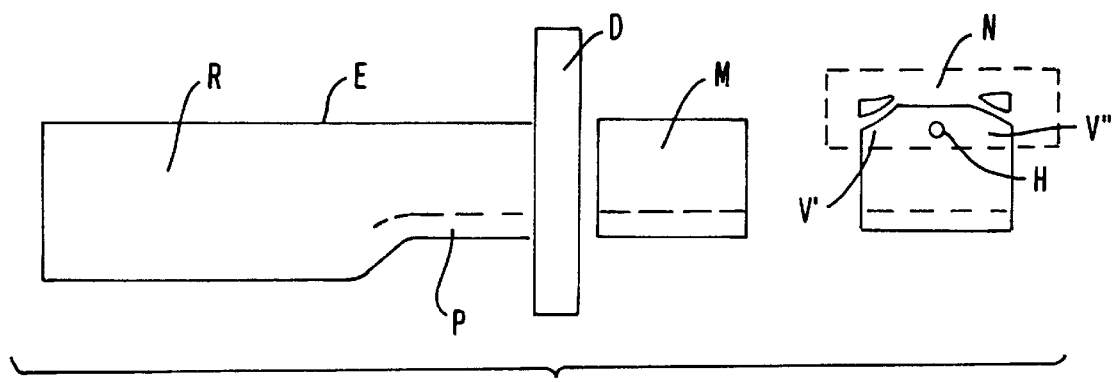
FIG. 2 is a plan view of a prior art process, which illustrates a typical sideweld bag manufacturing process.

In FIG. 2 prior art sideweld process begins with a flattened tube R, which is slit open at edge E, bottom gusseted at P, which tube R is then sidewelded at D into individual bags, which bags are stacked up at location M. These bag stacks are typically picked up by an employee who may die cut the bag stack at manual die cutting press N, in this illustration forming die cut handles H and sculptured shoulders V' and V".

In FIG. 3 the present invention bottom seal process begins with a flattened tube 10, which is slit sealed by slit-seal knife 12 into two smaller flattened tubes 14 and 14', which smaller tubes 14 and 14' are then side gusseted at 16 and 18 and 16' and 18' respectively. Tubes 14 and 14' are then fed through bottom sealer 20 which sealer 20 makes two lateral seals (not shown) across tubes 14 and 14' and simultaneously severs tubes 14 and 14' between the two seals, creating two side-by-side, severed and sealed portions illustrated as 22 and 22', which portions have been transported forward and stacked up, typically into stacks of 50 or so. Severed and sealed portions 22 and 22' have lateral seals 24 and 26 and 24' and 26' respectively at both ends and gussets 16a and 18a and 16a' and 18a' respectively on their sides. One step forward in the process, two side-by-side severed and sealed portions have been transported by clamping fingers 42 and 44 and 42' and 44' respectively, to an intermediate point under die cutter 30, which die cutter 30 is shown as having die cut the two side-by-side severed and sealed portions into four individual bag stacks 32a and 32b and 32a' and 32b' by knife 31 and has die cut handles holes 33a, 33b, 33a' and 33b' respectively. Each bag stack 32a, 32b, 32a' and 32b' has side gussets, 36a and 38a, 36b and 38b, 36a' and 38a', and 36b' and 38b' respectively, and lateral seals 34, 36, 34' and 36' respectively, which lateral seals have formed bag bottoms 40a, 40b, 40a' and 40b'. From this die cut operation, the bag stacks 32a, 32b, 32a' and 32b' would be transported to a loading station. This illustration shows that two slit sealed tubes can be made into four bag packs during a single cycle of the bag machine's operation. It also illustrates that the die cutting operation has the tremendous flexibility of creating virtually any style of bag and is not limited to interconnected, detachable bags. For instance, in addition to detachable bags, it may form bags with flush tops and no handles, bags with die cut handles, bags with sculptured shoulders, bags with a multitude of tab designs, T-shirt style plastic grocery sacks and so on. As is further described in the following FIG. 4, the continued process of the present invention will also eliminate the need or the extra labor required to tear apart interconnected detachable bags at a weakened tear line. It should also be understood that the process of the present invention may be applied to a tube that has been slit sealed into more than just two smaller tubes, for instance, three, four or even five tubes. In such a case, three, four or five tubes would then be converted into six, eight or ten individual bag stacks.

In FIG. 4 the process of FIG. 3 shows bag stacks 32b and 32b' have been already transported from the die cutter 30 to a packing station by fingers 42, 44, 42' and 44' respectively (see FIG. 3 to view location of Fingers 42, 44, 42' and 44' just before the transportation of bags stacks 32b and 32b'). Fingers 42, 44, 42' and 44' are now shown in position to grasp the second sets of bag stacks 32a and 32a', which bag stacks will also be transported to the same packing station where bag stacks 32b and 32b presently lie. Fingers 42, 44, 42' and 44' are typically a part of a movable carriage system that grasps and transports bags along the production line. In the process of the present invention, the fingers and carriage system will cycle twice during any one die cutting operation instead of only once, as would be the case with prior art.

Figure 5:
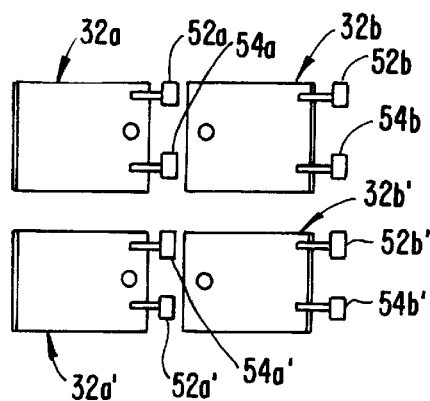
FIG. 5 is a partial plan view of another means of transferring the two side-by-side bag stacks to a conveyor.

In FIG. 5 a variation on transporting the bag stacks is illustrated by four sets of fingers, which fingers 52a and 54a grasp bag stack 32a, fingers 52b and 54b grasp bag stack 32b, fingers 52a' and 54a' grasp bag stack 32a', and fingers 52b' and 54b' grasp bag stack 32b', all of which fingers and bags stacks are simultaneously transported to a packing station (not shown). It is important to note that there are other transportation possibilities in the process of the present invention, for instance, the bag stacks may be grasped by two sets of fingers in which each set grasps two stacks simultaneously. The present invention is not intended to be limited by the means of bag stack transport.

Figure 6:
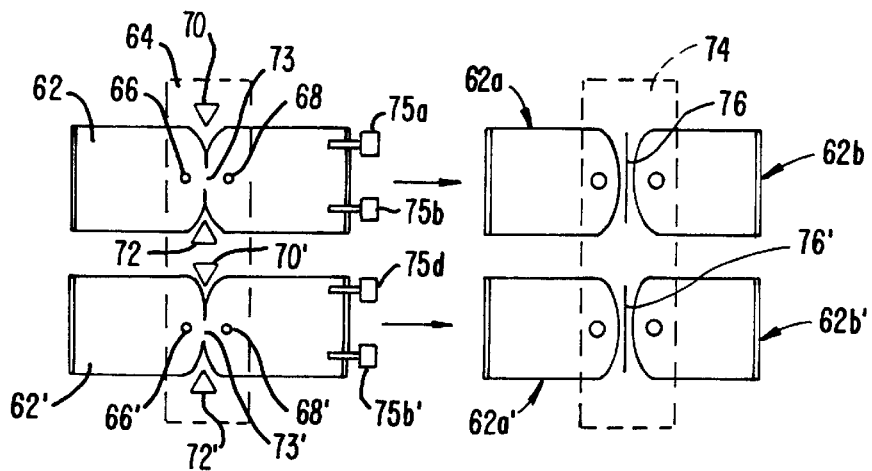
FIG. 6 is a partial plan view of a means of transferring the two severed and sealed portions through a two-step die-cutting operation.

In FIG. 6 two severed and sealed portions 62 and 62' have been transported to an intermediate point at first die cutting station 64 in which die cut handle holes 66 and 68 and edge portions 70 and 72 have been cut and extracted (handle hole slugs not shown) from severed and sealed portion 62, and; die cut handles 66' and 68' and edge portions 70' and 72' have been cut and extracted (handle hole slugs not shown) from severed and sealed portion 62'. Severed and sealed portions 62 and 62' remain connected via bridges 73 and 73' respectively. The arrows then show the same two severed and sealed portions 62 and 62' as they have been subsequently transported (arrows) by fingers 75a and 75b, and 75a' and 75b' respectively, to an intermediate point at second die cutting station 74 in which knives 76 and 76' of die cutting station 74 have severed the two portions 62 and 62' at their respective bridges 73 and 73' (before severance) forming four individual bag stacks 62a, 62b, 62a' and 62b'. This second die cutting operation is conducted near the bag packaging station, to which the bag stacks may be easily delivered by fingers to a conveyor belt or even dropped right upon the conveyor belt once severed. Or, the bag stacks themselves may be dropped directly on the belt itself or even manually removed from the second die cutting station and packed into shipping cartons. In this two-step operation, it is also ideal for heat sealing tabs if desirable, or releasably bonding bag packs as discussed in my co-pending Provisional Patent Application Ser. No. 60/089,582 filed Jun. 17, 1998 by the named inventor herein entitled Plastic Bag Bundling System now patent application Ser. No. 09/258, 010 filed Feb. 25, 1999 of even date herewith entitled Plastic Bag Bundling System is likewise incorporated by reference as if fully set forth herein.

Figure 7:
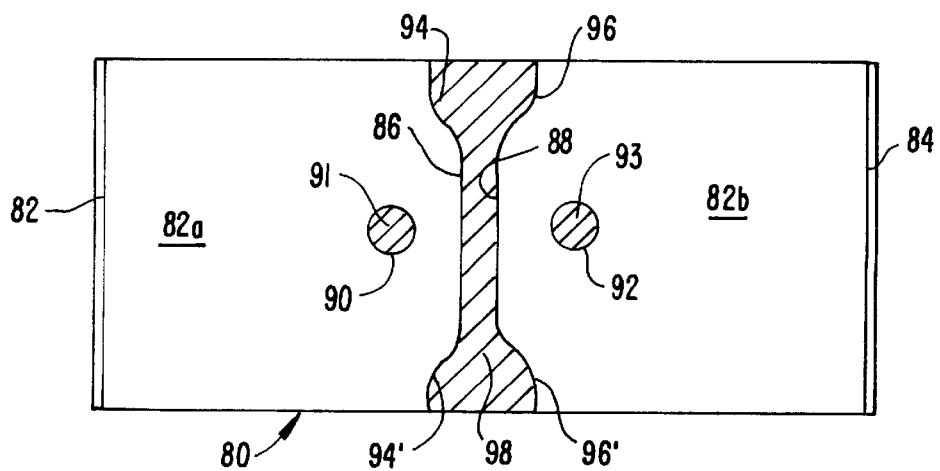
FIG. 7 is a plan view of a severed and sealed portion being die cut into two bag packs with die cut handles and a sculptured top made as made by the process of the present invention.

In FIG. 7 severed and sealed tube portion 80 has opposing bottom seals 82 and 84 and has been die cut at an intermediate point to form opposing bag tops 86 and 88, die cut handles 90 and 92, and sculptured shoulders 94 and 96 and 94' and 96', all together which form two opposing bag stacks 82a and 82b. In the center of the opposing bag tops 86 and 88 and the opposing sculptured shoulders 94 and 96 and 94' and 96' is slug 98 (shade lines), which is a result of the die cutting operation. After the die cutting operation has been completed, slug 98 and slugs 91 and 93 (shade lines) formed from the die cutting of handles 90 and 92 are all typically pushed into a recycling (or reprocessing) bin, which contents are later reprocessed into finished product. From this die cutting operation, the bag stacks are transported as previously described to a packing station.

Figure 8:
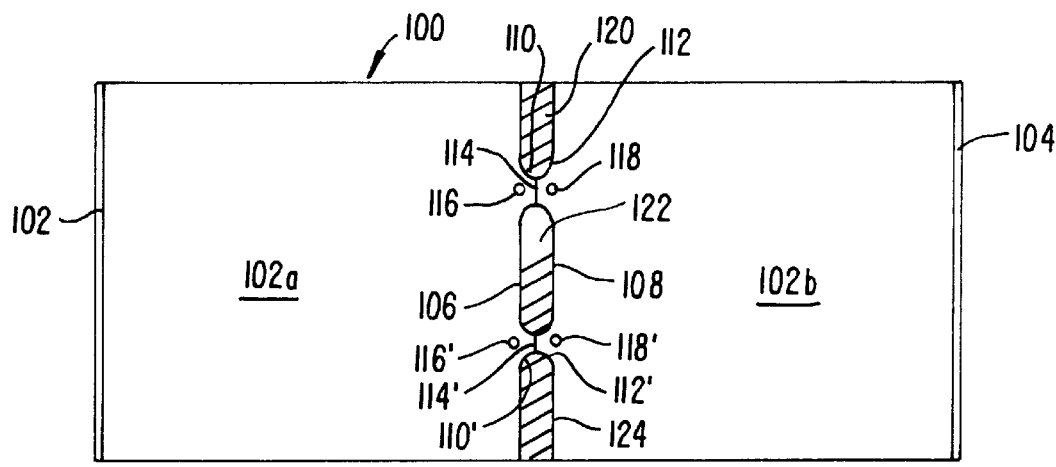
FIG. 8 is a plan view of a severed and sealed portion being die cut into two bag packs with double extended portions above the bag mouth as made by the process of the present invention.

In FIG. 8 severed and sealed tube portion 100 has opposing bottom seals 102 and 104 and has been die cut at a intermediate point to form opposing bag tops 106 and 108 and double extended portions 110, 110', 112 and 112' at the opposing bag tops 106 and 108 respectively, all together which form two opposing bag stacks 102a and 102b. The extended portions 110, 110', 112 and 112' are shown separated and defined by cut lines 114 and 114' respectively, which cut lines may have been made from either the single or two-step die cutting process previously described. In the center of the extended portions 110,110', 112 and 112' are mounting holes 116,118,116' and 118' respectively. Slugs 120, 122 and 124 (shaded lines) will be removed and reprocessed once again in the same manner as previous discussed. These bags with double extended portions have been made according to my co-pending Provisional Patent Application Ser. No. 60/089,582 filed Jun. 17, 1998 by the named inventor herein entitled Plastic Bag Bundling System now patent application Ser. No. 09/258,010 filed Feb. 25, 1999 of even date herewith entitled Plastic Bag Bundling System is likewise incorporated by reference as if fully set forth herein.

Figure 9:
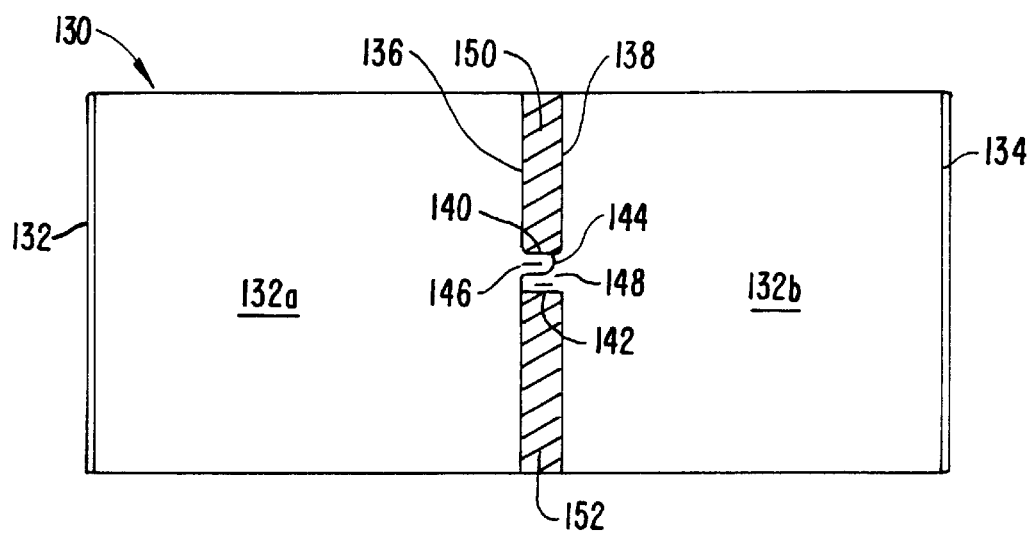
FIG. 9 is a plan view of a severed and sealed portion being die cut into two bag packs with single extended portions above the bag mouth which single portions are offset on the opposing bag mouths of the bag packs, as made by the process of the present invention.

FIG. 9 severed and sealed tube portion 130 has opposing bottom seals 132 and 134 and has been die cut at an intermediate point to form opposing bag tops 136 and 138 and single off-set extended portions 140 and 142 at the opposing bag tops 136 and 138 respectively, all together which form two opposing bag stacks 132a and 132b. The extended portions 130 and 132 are shown separated by cut line 134, which cut line may have been made from either the single or two-step die cutting process previously described. In the center of the extended portions 130 and 132 are mounting holes 146 and 148 respectively. Slugs 150 and 152 (shaded lines) will be removed and reprocessed in the same manner as previous discussed. These bags with single extended portions have been made according to my co-pending Provisional Patent Application Ser. No. 60/089, 582 filed Jun. 17, 1998 by the named inventor herein entitled Plastic Bag Bundling System now patent application Ser. No. 09/258,010 filed Feb. 25, 1999 of even date herewith entitled Plastic Bag Bundling System is likewise incorporated by reference as if fully set forth herein.

Figure 10:
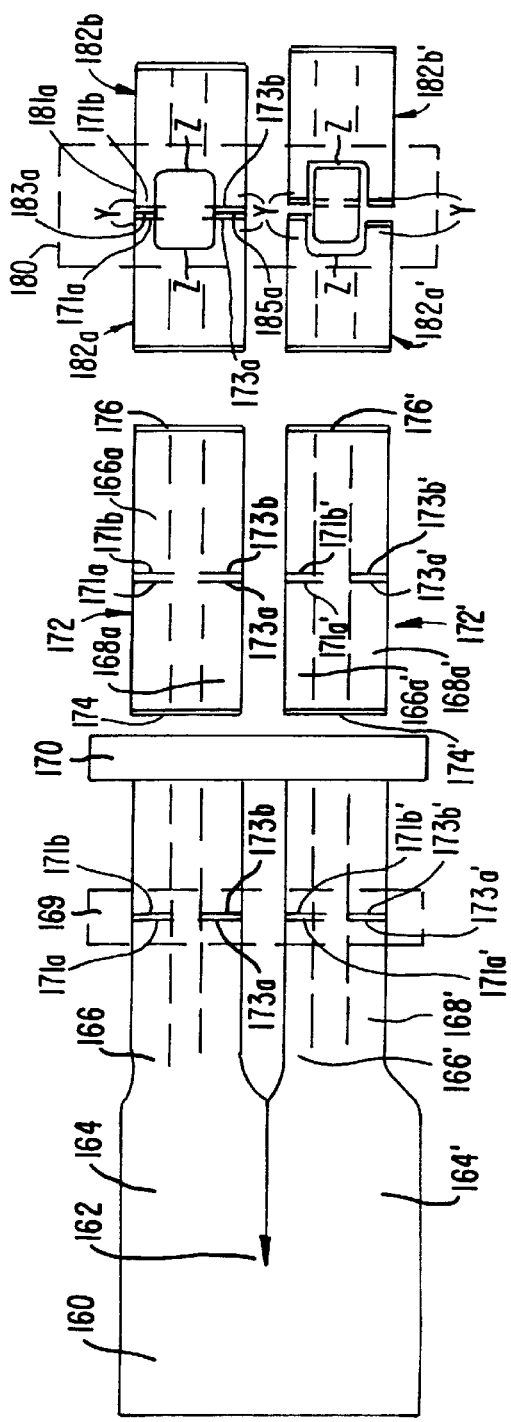
FIG. 10 is a plan view of the present invention as it may be applied to the process of making plastic T-shirt style, handled grocery sacks.
Figure 11:
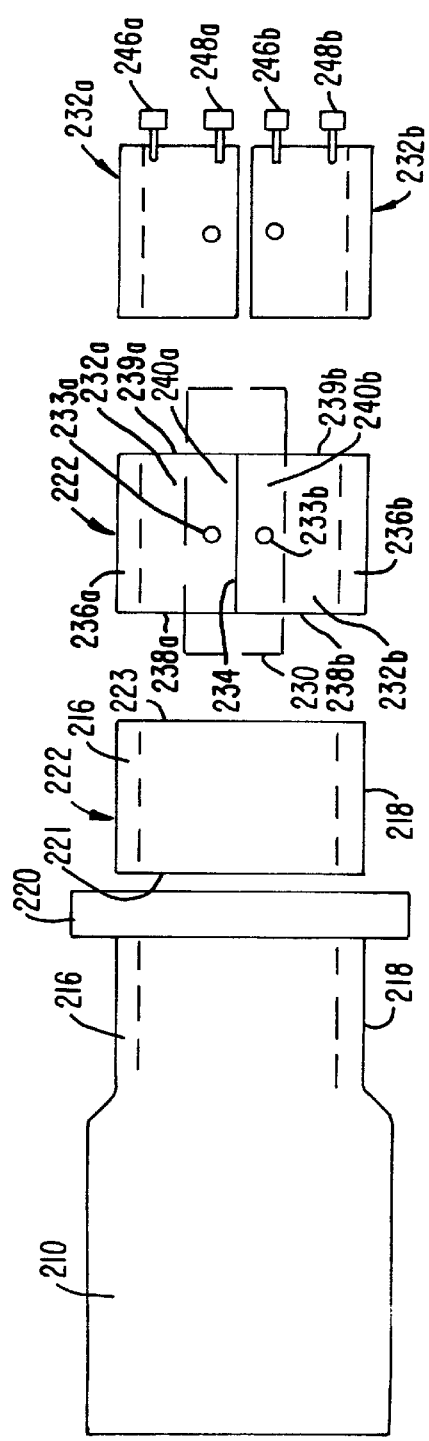
FIG. 11 is a plan view of the present invention, which shows the process of die cutting preformed plastic tubes sealed at both leading and trailing edges, into independent stacks of common plastic sideweld bags with die cut handles.

In FIG. 10 the present invention bottom seal process begins with a flattened tube 160, which is slit sealed by slit-seal knife 162 into two smaller flattened tubes 164 and 164', which smaller tubes 164 and 164' are then side gusseted at 166 and 168 and 166' and 168' respectively. At seal location 169, gusseted tubes 14 and 14' are sealed laterally at 171a, 171b, 173a and 173b, and 171a', 171b', 173a' and 173b' respectively. These lateral seals 171a, 171b, 173a and 173b, and 171a', 171b', 173a' and 173b' traverse the gussets 166, 168 and 166' and 168' as illustrated. Tubes 164 and 164' are then fed through bottom sealer 170, which sealer 170 makes two more lateral seals (not shown) across the entire width of tubes 14 and 14' entirely and simultaneously severs tubes 14 and 14' between the two seals, creating two side-by-side, severed and sealed portions illustrated as 172 and 172', which portions respectively have lateral seals 171a, 171b, 173a and 173b, and 171a', 171b', 173a' and 173b' at an intermediate location and which severed and sealed portions 172 and 172' are stacked up into a typical stack of 50 bags or so. As illustrated, stacked up severed and sealed portions 172 and 172' have lateral seals 174 and 176, and 174' and 176' respectively, at their ends, which lateral seals were made at bottom sealer 170 and extend across the entire width of the portions 172 and 172', and; portions 172 and 172' have gussets 166a and 168a and 166a' and 168a' respectively on their sides. One step forward in the process, the two side-by-side severed and sealed portions have been transported by any of the means previously described to an intermediate point under die cutter 180, which die cutter 180 is shown as having die cut the two side-by-side severed and sealed portions into four individual bag stacks 182a and 182b and 182a' and 182b' (shown in its view after being die cut and as separated from the die cut operation) by rectangular central die cut knives 181a and 181b (not shown) and their respective blades 183a and 185a, and 183b and 184b (not shown), which blades 183a and 185a are shown cutting right in between the two pairs of lateral seals 171a and 171b and 173a and 173b. Die cuts 181a and 181b have formed handled T-shirt style bags much like those described in U.S. Pat. No. 4,676,378 Baxley, with outer opposing strap handles Y and a central bag mouth region Z. Die cutting this type of bag pack may be done in either a single or two-step die cutting operation. The die cut between the lateral seals (as shown in 183a and 185a) forming the handles may also be done at the sealing station 169. What is most important is to illustrate that the two slit sealed tubes can be made into four bag packs and also illustrates the tremendous flexibility of forming various bag styles without interconnecting the bags with a weakened tear line. It should be understood that this bag making process may also be applied to a tube that has been slit sealed into more than just two smaller tubes, for instance, three, four or even five tubes. In such a case, three, four or five tubes would then be converted into six, eight or ten individual bag stacks. In forming plastic grocery sacks of this style, using a two-step die cutting process may also be advantageous. The first step may die cut the handle portions thereby forming the two side-by-side bag packs, and the second step may sever the bag packs entirely while simultaneously releasably bonding the bag packs together.

In FIG. 1 the present invention sideweld process begins with a flattened tube 210, which is then gusseted at 216 and 218 respectively. Tube 210 is then fed through bottom sealer 220 which sealer 220 makes two lateral seals (shown as sealed side edges 221 and 223) which seals 221 and 223 simultaneously cuts tube 210 into severed and sealed portion 222, which portion 222 has been stacked up into a stack of typically 50 bags or so. Severed and sealed portion 222 now has lateral seals 221 and 223 on its side regions and gussets 216 and 218 on its outer top and bottom regions. One step forward in the process, the severed and sealed portion 222 is shown transported to an intermediate point under die cutter 230, which die cutter 230 is shown as having die cut the severed and sealed portion 222 into two individual bag stacks 232a and 232b at cut line 234, which bag stacks 232a and 232b have die cut handles holes 233a and 233b respectively. Each bag stack 232a and 232b has bottom gussets, 236a and 236a respectively, and lateral sealed edges 238a and 239a and 238b and 239b respectively, and die cut line 234 has formed two bag tops 240a and 240b respectively. From this die cut operation, the bag stacks 232a and 232b would be transported to a loading station by fingers 246a and 248a, and 246b and 248b respectively, as shown in the sequence. The bag stack transportation means may be any of those previously described. This illustration shows that a single sidewelded tube can be made into two bag packs during a single cycle of the bag machine's operation. It also illustrates the tremendous flexibility of the die cutting operation, forming virtually any style sideweld bag and also is not limited to interconnecting the bags. For instance, in addition to sideweld bags illustrated, they may have flush tops and no handles, may have sculptured shoulders with handles, and may even be a form of T-shirt bag. In a similar manner as has been previously described the sideweld process of the present invention may also be applied to two, three, four or even five tubes. In such a case, three, four or five tubes would then be converted into six, eight or ten individual bag stacks.

Figure 12A:
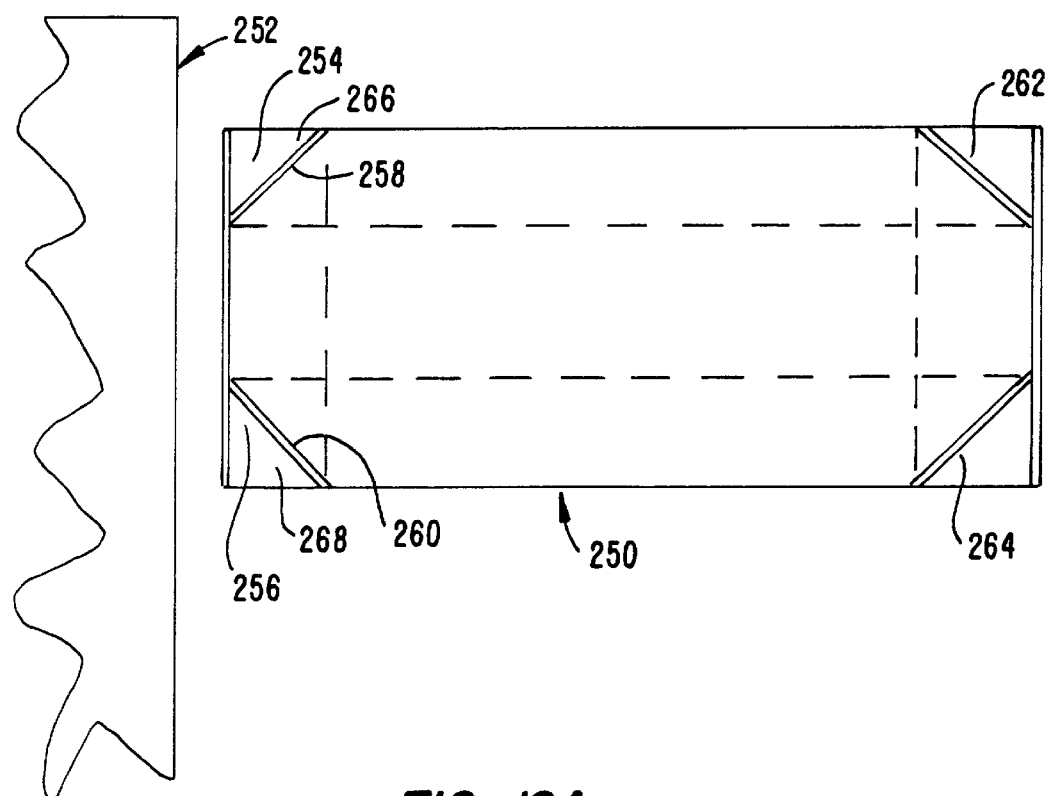
FIG. 12A is a partial plan view showing the application of angular bottom seals used to isolate the holes in the bag bottom created by a pin stacking process.

In FIG. 12A severed and sealed bag portion 250 is shown after it has left bag bottom sealer 252 and stacked up on stacking pins 254 and 256. At the lower outer corners of severed and sealed bag portion 250 are angular seals 258, 260, 262 and 264. These seals may have been made much like those described in U.S. Pat. No. 3,915,007 LaFleur, or in my co-pending Provisional Patent Application entitled Cold Sealing of Plastic Film Ser. No. 60/088,612 filed Jun. 9, 1998 by the named inventor herein now patent application Ser. No. 09/257,848 filed Feb. 25, 1999 of even date herewith entitled Apparatus and Process for Cold Seal in Plastic Bags is likewise incorporated by reference as if fully set forth herein.

Angular seals 258 and 260 serve to confine the holes made by stacking pins 254 and 256 into the outer portions 266 and 268. These outer portions 266 and 268 will be located at the eventual bag bottoms underneath the folded over gussets and are not vulnerable to stress when the bag will be subsequently loaded, which therefor, the holes formed at stacking pin locations 254 and 256 will not be vulnerable to breaking when place under load. The isolation of stacking pins may be accomplished in a variety of means, but the one illustrated in FIG. 12A would be a preferred means, since the angle seals also provide a desirable, primary function. One of the keys to the process of the present invention with pin stacking systems, is to place the pin stacking means towards the outer, lower regions where the holes could then be isolated and not be vulnerable to tearing under stress—unlike being located in the middle region where pin stacking holes would readily tear once the final bag product were placed under load. It will be seen that outer portions 266 and 268 meet this condition of not being subject to tearing when the bag is loaded. Similarly, the portions of the front panel can meet this limitation.

Figure 12B:
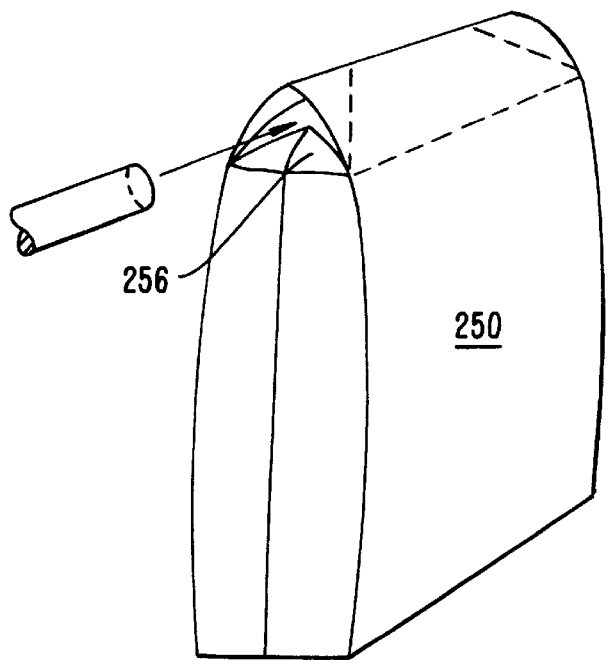
FIG. 12B illustrates the bag unit of FIG. 12A used for filling with cement or other granular contents through a pneumatic filling aperture.

FIG. 12B illustrates an interesting bag unit. Specifically by placing a pneumatic nozzle 269, the bag unit of FIG. 12A can be filled as illustrated in FIG. 12B. Filling occurs in—for example—triangular portion 256—with the triangular portion being severed for hinge like motion with respect to the double bag unit. Later, when the double bat unit is filled and stacked, triangular portion 256 hinges closed under the force of cement trying to escape the bag. A self seal bag unit results.

Figure 13:
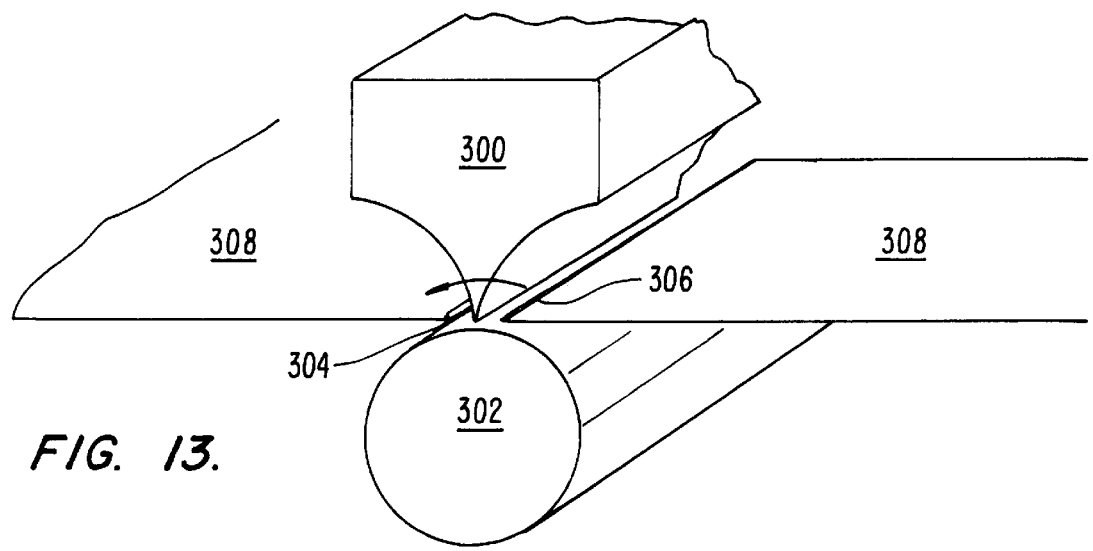
FIG. 13 is a perspective view of apparatus for creating a seal across at least the bottom of a bag.
Figure 14:
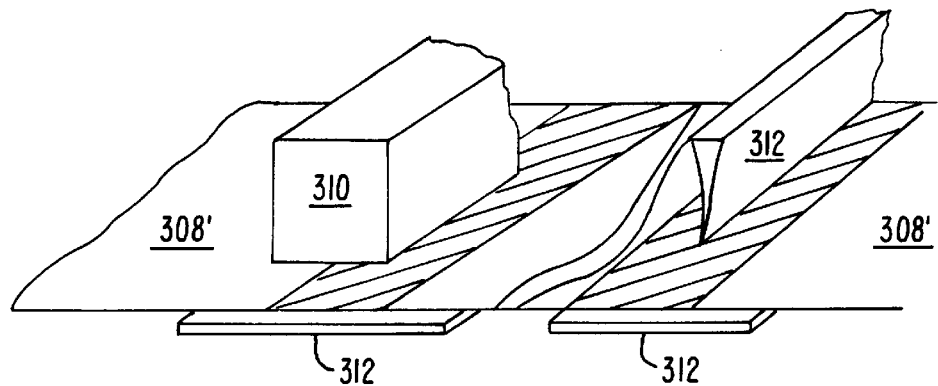
FIG. 14 is a perspective view of apparatus for creating a seal across at least the bottom of the bag, the seal mechanism here shown taking a relatively wide seal and cutting the relatively wide seal in half.

Referring to FIGS. 13 and 14, two types of seals are illustrated. Referring to FIG. 13, a known seal called a "slit seal" is illustrated. Knife-edge 300 heated between 400 and 1000 degrees F periodically comes down on roller 302 with bag material 308 passing between the knife-edge and roller. This leaves two seal beads 304, 306 sealing the bottom of the respective bags. Similarly, and if FIG. 14, a broad conventional hot seal is impressed by heated bar 310 on platen 312 on bag material 308'. The broad heat seal 310 results. This broad heat seal is cut by down stream knife 312. Naturally, various other combinations of seal and knives will work with this described invention.

From the foregoing descriptions of the process and the many applications of using the process of the present invention, as illustrated in both bottom seal and sideweld applications, it will be appreciated that the number of new applications are many. It is not the intention of the present invention to be limited solely to the film products illustrated herein or to the two individual processes, but to be used in whatever conceivable manner to improve the performance of a plastic bag, sheet, film, laminated film, or blended film manufacturing processes. For instance, any of the processes described herein may be used in lap seal or certain pouch applications as well.

It should also be understood that the means of stacking bags may include any number of possibilities, such as pin stacking, clamping, containing, paddlewheel stacking and so on. The result is still substantially the same as described herein.

Furthermore, it should also be understood that the means of transporting the bag stacks from and to die cutter and packing station may be any number of already acceptable means such as clamping with fingers on carriages, paddlewheel transport, conveyor belts and so on.

What is claimed is:

1. A process for bag manufacture of a bag having a first dimension from a sealed bottom of the bag to an open top of the bag, the bag being fabricated from a continuous tube of plastic film bag material; the process comprising the steps of:

providing a continuous tube of plastic film bag material with a front bag panel and a rear bag panel confronted to and in contact with one another at an inside surface of the front bag panel and the rear bag panel;

providing a sealing and cutting station having apparatus for placing two parallel seals and cutting the continuous tube of the plastic film bag material between the two parallel seals;

simultaneously forming and cutting first adjacent double seals across the front bag panel and the rear bag panel, the double seals in parallel side-by-side relation with one another;

advancing the continuous tube of plastic film bag material at least by twice the first dimension from the sealed bottom of the bag to the open top of the bag;

simultaneously forming and cutting second adjacent double seals across the front bag panel and the rear bag panel, the second adjacent double seals in parallel side-by-side relation with one another whereby a double bag unit is formed and severed having single seals at opposite ends of the double bag unit with the continuous tube of plastic film bag material having two first dimensions between the single seals at opposite ends of the double bag unit;

stacking a plurality of double bag units; and, medially cutting to completely sever the double bag unit at a medial portion of the double bag unit between the single seals at opposite ends to form two bags from the double bag unit.

2. The process for bag manufacture of a bag having a first dimension from a sealed bottom of the bag to an open top of the bag, the bag being fabricated from a continuous tube of plastic film bag material according to claim 1, the process comprising the further steps of:

forming first adjacent double seals across the front bag panel and the rear bag panel, the double seals in parallel side-by-side relation with one another with the plastic film bag material there between; and, cutting the continuous tube of plastic film bag material between the first adjacent double seals occurs simultaneously.

3. The process for bag manufacture of a bag having a first dimension from a sealed bottom of the bag to an open top of the bag, the bag being fabricated from a continuous tube of plastic film bag material according to claim 1, the process comprising the further steps of:

the medially cutting the double bag unit at a medial portion of the double bag unit step includes:

placing a central aperture in the medial portion of the double bag unit;

placing two side apertures in the medial portion of the double bag unit;

forming parallel double seals in the plastic film bag material on either side of the central aperture; and, cutting between the parallel double seals in the plastic film bag material to sever the double bag unit to form "T" shirt bags.

4. The process for bag manufacture of a bag having a first dimension from a sealed bottom of the bag to an open top of the bag, the bag being fabricated from a continuous tube of plastic film bag material according to claim 1, the process comprising the further steps of:

the medially cutting the double bag unit step includes excising portions of the double bag unit in the medial portion of the double bag unit.

* * * * *